United States Patent [19]
Tomita et al.

[11] Patent Number: 6,140,728
[45] Date of Patent: Oct. 31, 2000

[54] ELECTRIC MOTOR AND ELECTRIC POWER STEERING APPARATUS EMPLOYING THE ELECTRIC MOTOR

[75] Inventors: Masaaki Tomita, Toyota; Ryoji Mizutani, Aichi-ken, both of Japan

[73] Assignee: Toyota Jidosha Kabushiki Kaisha, Toyota, Japan

[21] Appl. No.: 09/370,987

[22] Filed: Aug. 10, 1999

[30] Foreign Application Priority Data

| Aug. 21, 1998 | [JP] | Japan | 10-235942 |
| Aug. 25, 1998 | [JP] | Japan | 10-239224 |
| Aug. 31, 1998 | [JP] | Japan | 10-245703 |
| Sep. 1, 1998 | [JP] | Japan | 10-247422 |

[51] Int. Cl.$^7$ .................................................. H02K 29/00
[52] U.S. Cl. ........................... 310/156; 310/254; 310/43; 310/218
[58] Field of Search .................... 310/156, 254, 310/259, 43, 218

[56] References Cited

U.S. PATENT DOCUMENTS

| 3,827,141 | 8/1974 | Hallerback | 310/42 |
| 4,015,154 | 3/1977 | Tanaka et al. | 310/42 |
| 5,162,685 | 11/1992 | Yamaguchi et al. | 310/156 |
| 5,191,256 | 3/1993 | Reiter et al. | 310/156 |
| 5,889,342 | 3/1999 | Hasebe et al. | 310/54 |
| 5,932,943 | 8/1999 | Werner et al. | 310/67 A |
| 5,982,067 | 11/1999 | Sebastian et al. | 310/184 |

FOREIGN PATENT DOCUMENTS

| 2-111238 | 4/1990 | Japan | H02K 1/27 |
| 4-69040 | 3/1992 | Japan | H02K 1/27 |
| 7-255138 | 10/1995 | Japan | H02K 1/27 |

*Primary Examiner*—Burt Mullins
*Attorney, Agent, or Firm*—Oliff & Berridge, PLC.

[57] ABSTRACT

An electric motor has a rotor for rotation in a stator and a plurality of permanent magnets arranged on an outer peripheral surface of the rotor. A radially inner side surface of each permanent magnet is a curved to generally be convex in a radially inward direction. The outer peripheral surface of the rotor has curved recess surfaces, each of which contacts the radially inner side curved surface of a corresponding permanent magnet so that magnetic flux between adjacent permanent magnets is considerably prevented from locally concentrating within the rotor.

10 Claims, 14 Drawing Sheets

COMPARATIVE PRIOR ART EXAMPLE

EMBODIMENT OF INVENTION

COMPARATIVE PRIOR ART EXAMPLE B

COMPARATIVE PRIOR ART EXAMPLE C

COMPARATIVE PRIOR ART EXAMPLE D

COMPARATIVE PRIOR ART EXAMPLE E

ELECTRIC MOTOR AND ELECTRIC POWER STEERING APPARATUS EMPLOYING THE ELECTRIC MOTOR

INCORPORATION BY REFERENCE

The disclosure of Japanese Patent Application Nos. HEI 10-235942 filed on Aug. 21, 1998; HEI 10-239224 filed on Aug. 25, 1998; HEI 10-245703 filed on Aug. 31 and HEI 10-247422 filed on Sep. 1, 1998 including the specification, drawings and abstract of each are incorporated herein by reference in their entirety.

BACKGROUND OF THE INVENTION

1. Field of the Invention

The invention relates to an electric motor and an electric power steering apparatus employing the electric motor and, more particularly, to the structure of a stator of the electric motor.

2. Description of the Related Art

Electric motors in which a plurality of permanent magnets are arranged on an outer peripheral surface of a rotor provided for rotation in a stator are described in, for example, Japanese Patent Application Laid-Open Nos. HEI 2-111238 and HEI 4-69040. An electric motor as described in these laid-open patent applications is designed to reduce cogging. Cogging is known as the nonuniform variations in torque that occur depending on the construction of a stator, a rotor, a permanent magnet, or the like, even when the motor is not electrified.

In the electric motor as described in the aforementioned laid-open patent applications, each permanent magnet disposed on the outer peripheral surface of the rotor has a generally semicylindrical or "C" shape in a section taken on a plane of rotation of the rotor, and each permanent magnet is disposed on an arc-shaped outer peripheral surface of the rotor that is arched radially outwards. In some cases, therefore, magnetic flux between adjacent permanent magnets locally concentrates in the rotor.

If magnetic flux locally concentrates in the rotor, a great magnetic loss, otherwise known as hysteresis loss, occurs. Moreover, the concentration of local magnetic flux in the rotor promotes the occurrence of a minor loop of magnetic flux in the permanent magnets. The minor loop is a closed loop of magnetic flux extending in a space portion such that the north N and south S poles of the permanent magnets are short-circuited. The resulting magnetic loss in the rotor increases the magnetic resistance in the rotor so that the motor efficiency deteriorates and the output torque decreases. The minor loop of the magnetic flux of the permanent magnets does not contribute to the motor output and, moreover, deteriorates the motor efficiency, thereby reducing the output torque. If a minor loop protrudes into an air gap portion between the rotor and the stator, the minor loop affects the distribution of other magnetic fluxes, resulting in the promotion of the occurrence of torque ripple and cogging. Torque ripple is known as the variations in torque that occur during motor electrification.

The output torque of an electric motor can be increased by increasing the size of each permanent magnet. However, since this requires a large quantity of expensive permanent magnets, the production cost considerably increases as does the size of the electric motor.

SUMMARY OF THE INVENTION

Accordingly, it is an object of the invention to provide an electric motor and electric power steering apparatus employing the electric motor, having an improved motor efficiency and producing an increased output torque that restrains the occurrence of torque ripple and cogging.

In accordance with the invention, an electric motor includes a stator, a rotor that rotates in the stator, and a plurality of permanent magnets disposed on an outer peripheral surface of the rotor. A radially inner side surface of each permanent magnet is curved to generally be convex in a radially inward direction. The outer peripheral surface of the rotor has curved recess surfaces, each of the curved recess surfaces contacts the radially inner side curved surface of a corresponding permanent magnet. A radially outer side surface of each permanent magnet may have a shape similar to a circumferentially divided segment of a peripheral surface of an imaginary cylinder whose center axis coincides with an axis of the rotor.

In the electric motor of the invention, the radially inner side surface of each of the permanent magnets arranged on the outer peripheral surface of the rotor is generally convexed radially inwards in its sectional shape taken on a plane of rotation. The outer peripheral surface of the rotor is provided with the curved recess surfaces for contact with the radially inner side curved surfaces of the permanent magnets. Therefore, the area of contact between each permanent magnet and the rotor can be increased so that the magnetic flux between adjacent permanent magnets is prevented from locally concentrating in the rotor.

Consequently, the magnetic loss in the rotor can be reduced so that the motor efficiency can be improved and the output torque can be increased. Furthermore, the occurrence of a minor loop of magnetic flux of a permanent magnet can also be restrained so that the motor efficiency can be improved and the output torque can be increased. Further, the occurrence of torque ripple and cogging can be substantially limited. Further, since the permanent magnets are partially embedded in the rotor, the air gap formed between the rotor and the stator can be reduced so that the output torque can be increased.

The invention can be realized by changing the shape of the permanent magnets and the shape of the rotor. Therefore, in comparison with an electric motor wherein permanent magnets are enlarged in size to increase the output torque, the electric motor of the invention requires fewer permanent magnets, which are normally expensive, and allows an economical and compact design of the electric motor. Thus, the invention provides a small-size and high-torque output electric motor at a low cost. Furthermore, the invention allows an increase in the area of contact between each permanent magnet and the rotor, so that if each permanent magnet is fixed to the rotor by an adhesive, for example, the adhesion strength can be increased.

If the radially outer side surface of each permanent magnet is shaped similar to a circumferentially divided segment of the peripheral surface of an imaginary cylinder whose center axis coincides with the axis of the rotor, each permanent magnet can be adhered and fixed to the outer peripheral surface of the rotor with high precision by using the radially outer side surface of each permanent magnet as a reference surface. Thus, the electric motor according to the invention is assembled more efficiently.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

A preferred embodiment of the invention will be described in detail hereinafter with reference to the accompanying drawings.

Figure 1:
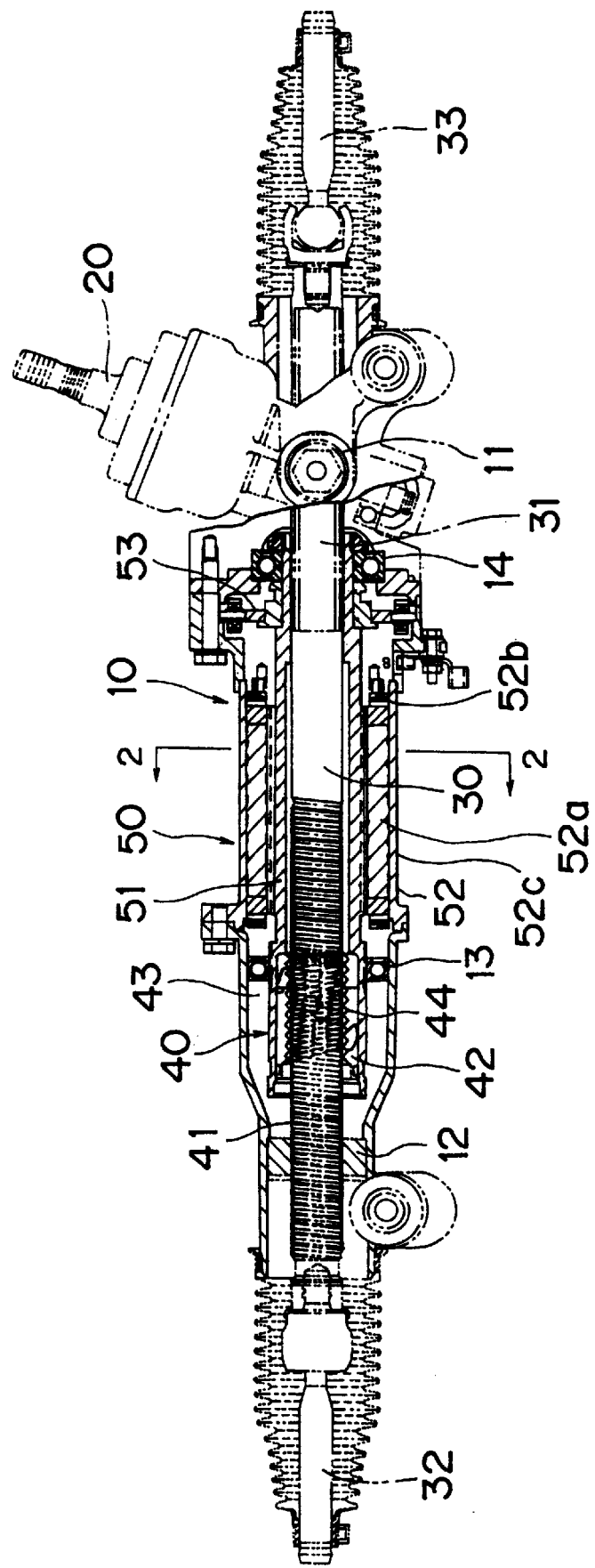
FIG. 1 is a cross-sectional view of an electric power steering apparatus using an electric motor according to the invention.

FIG. 1 shows a rack-pinion type steering apparatus having an electric motor 50. The steering apparatus has an input shaft 20, a steering shaft 30, a ball screw mechanism 40, the electric motor 50, and the like mounted to a housing 10 of a vehicle body (not shown). The housing 10 extends in right and left direction relative to the longitudinal, or front to back, direction of the vehicle body.

The input shaft 20 is mounted to the housing 10 to be rotatable, but is prevented from moving in an axial direction of the input shaft 20. At an outer end portion protruding from the housing 10, the input shaft 20 is connected to a steering wheel via a universal joint, an intermediate shaft, a universal joint, a steering main shaft, and the like (none of which are shown) in such a manner that torque can be transmitted therebetween. The input shaft 20 is engaged, at a pinion (not shown) formed on an inner end portion of the input shaft 20, with a rack portion 31 formed on the steering shaft 30 so that steering power is transmitted between the input shaft 20 and steering shaft 30. Therefore, by rotating the input shaft 20, the steering shaft 30 is moved in either of left and right directions relative to the front to back direction of the vehicle body.

The steering shaft 30 is generally referred to as a rack bar. The steering shaft 30 is elastically supported at a site thereof facing the pinion of the input shaft 20, a side portion opposite to the rack portion 31 formed on the steering shaft 30, by a rack guide 11 which is mounted to the housing 10 in such a manner that the steering shaft 30 is movable in radial directions of the steering shaft 30. A left end portion of the steering shaft 30 is secured to and supported by an end stopper 12 mounted to the housing 10 such that the left end portion of the steering shaft 30 is prevented from moving in the radial directions of the steering shaft 30. In this manner, the steering shaft 30 is mounted to be movable in the left and right directions relative to the direction of the vehicle body and is prevented from rotating. The steering shaft 30 extends through the housing 10, and connects at its left and right ends to steered wheels (not shown) via tie rods 32 and 33, respectively, and knuckle arms (not shown) in such a manner that steering power is transmitted from the steering shaft 30 to the wheels. The steering shaft 30 integrally includes a screw shaft 41 for the ball screw mechanism 40. A spiral groove is formed on the outer peripheral surface of the screw shaft 41. The ball screw mechanism 40 rotationally displaces the transmitting force from the elastically supported portion supported by the rack guide 11 to the rigidly supported portion supported by the end stopper 12 in a fixed manner by converting the rotation of an output shaft 51 of the electric motor 50 to displace the steering shaft 30 in a direction of the axis of the steering shaft 30.

The ball screw mechanism 40 is coaxial with the steering shaft 30 and includes the screw shaft 41, a nut 42 disposed on the outer peripheral surface of the screw shaft 41 and connected to the output shaft 51 of the electric motor 50 such that the nut 42 is rotatable around the steering shaft 30 together with the output shaft 51 and prevented from moving in the axial directions of the steering shaft 30, and a plurality of balls 44 rotatably supported by a thin-wall tubular cage 43 between the nut 42 and the screw shaft 41. The balls 44 are disposed between the spiral grooves formed on the outer peripheral surface of the screw shaft 41 and a spiral grooves formed formed on an inner peripheral surface of the nut 42.

The electric motor 50 provides a steering assisting force to the steering shaft 30 in either direction of the axis thereof via the ball screw mechanism 40. The electric motor 50 is mounted coaxially with the steering shaft 30. The electric motor 50 includes a tubular output shaft 51 mounted to the housing 10 via ball bearings 13, 14 such that the output shaft 51 is rotatable but prevented from moving in the axial directions of the output shaft 51, and a stator 52 that forms a portion of the housing 10. The rotating output of the electric motor 50 is controlled by a control device (not shown) based on signals from a well-known steering torque sensor (not shown), a sensor 53 for detecting the rotation of the output shaft 51, and the like.

Figure 2:
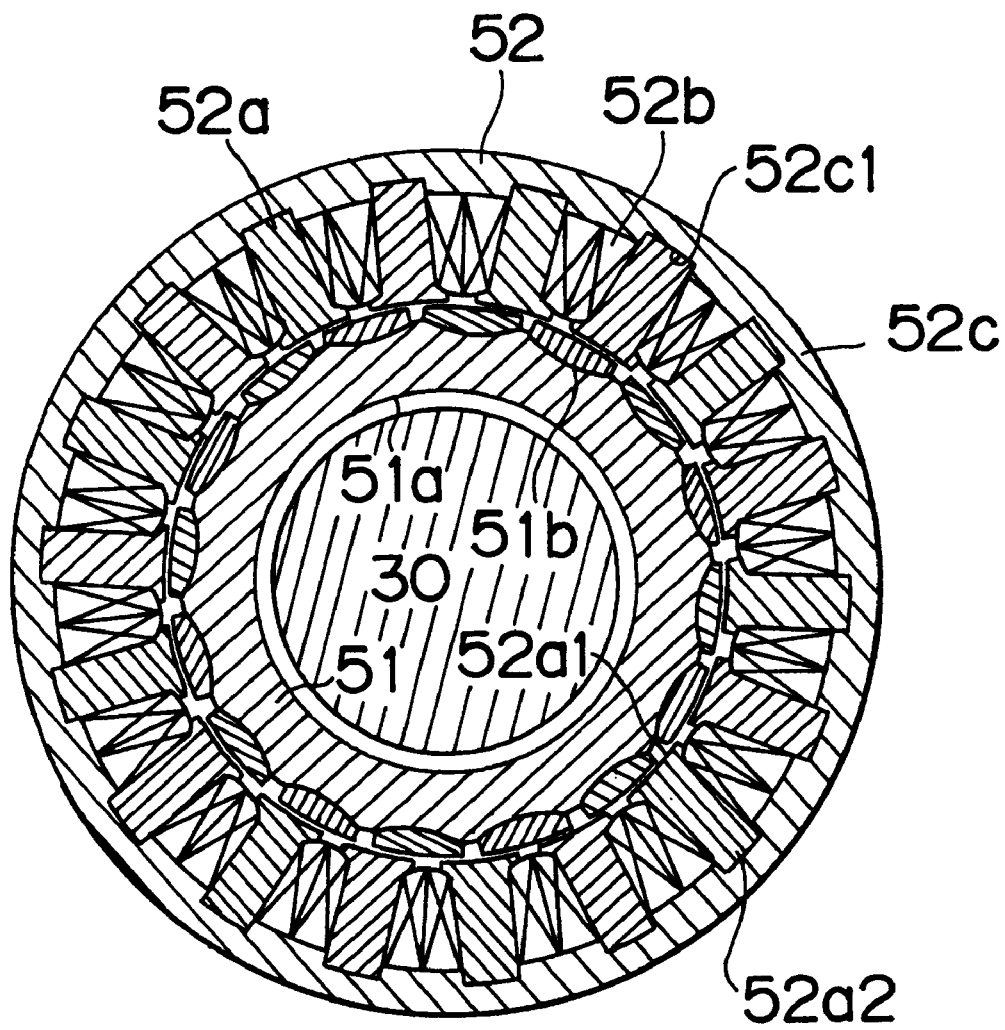
FIG. 2 is a sectional view taken along line 2—2 of FIG. 1.
Figure 3:
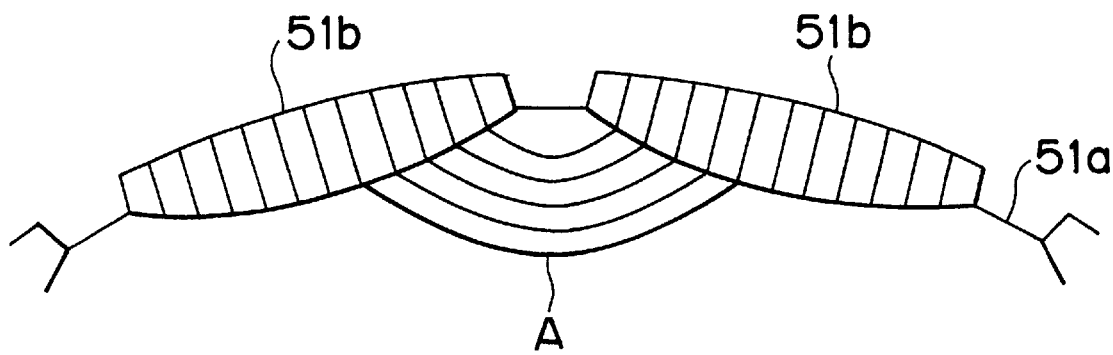
FIG. 3 is an enlarged schematic diagram of a rotor and permanent magnets.

As shown in FIGS. 1 through 3, the output shaft 51 is substantially made up of a rotor 51a having a stepped tubular shape, and a plurality of permanent magnets 51b arranged equidistantly on an outer peripheral surface of the rotor 51a. The permanent magnets 51b are arranged so that the south S pole and the north N pole alternate. Each permanent magnet 51b is elongate in an axial direction. A radially inner side surface of each permanent magnet 51b is curved to generally be convex in a radially inward direction. A radially outer side surface thereof has a shape similar to a segment of the peripheral surface of an imaginary cylinder whose center axis coincides with the axis of the the rotor such that opposite ends of each permanent magnet 51b are thinner than an intermediate portion of the magnet 51b. The outer peripheral surface of the rotor 51a has a plurality of concave recessed surfaces, each recessed surface substantially conforming to and contacting the radially inner side curved surface of a corresponding permanent magnet 51b.

Figure 4:
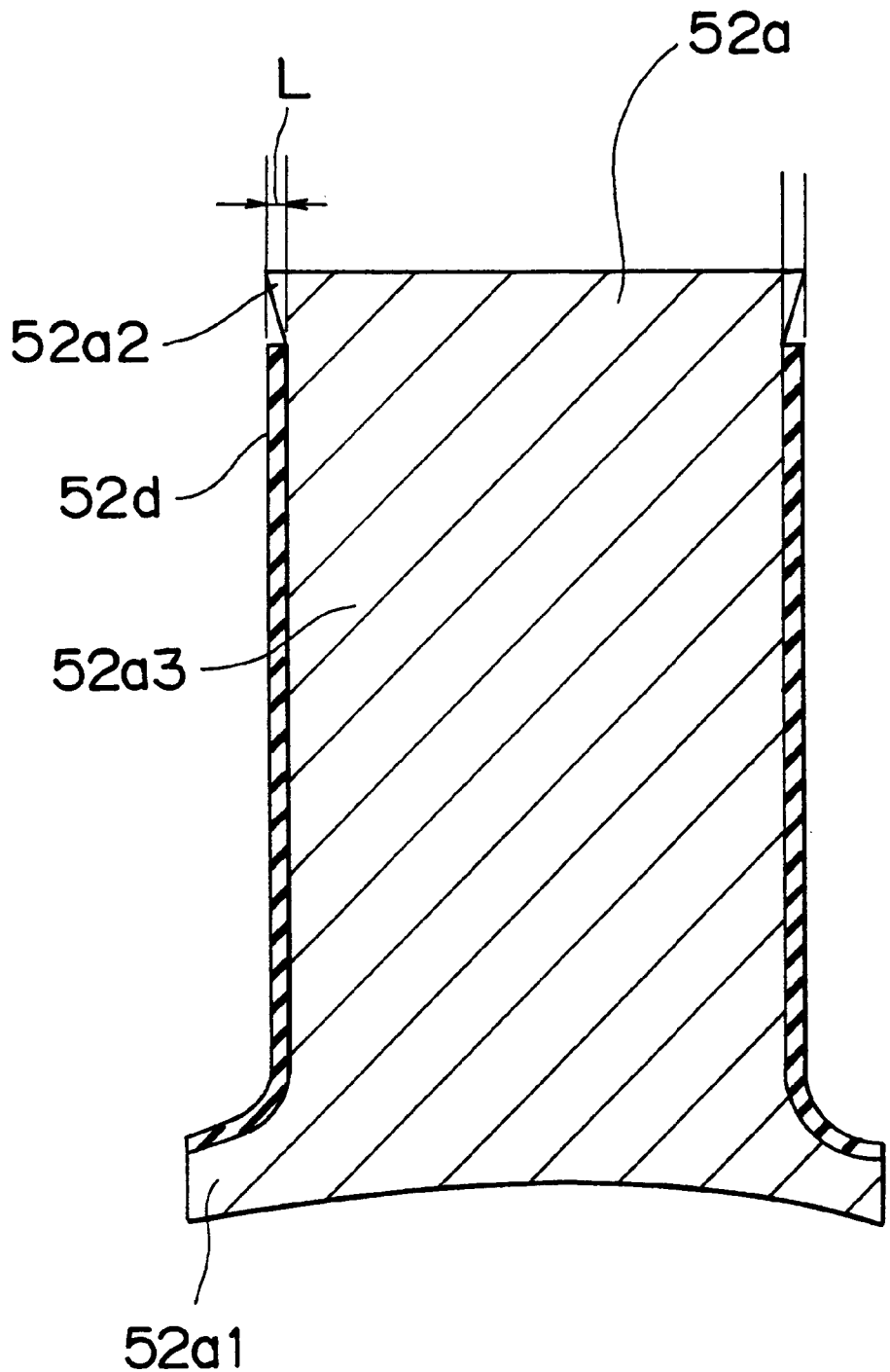
FIG. 4 is an enlarged view of a tooth part illustrating a positional relationship between an insulating paper sheet and a protruded portion of the tooth part.
Figure 5:
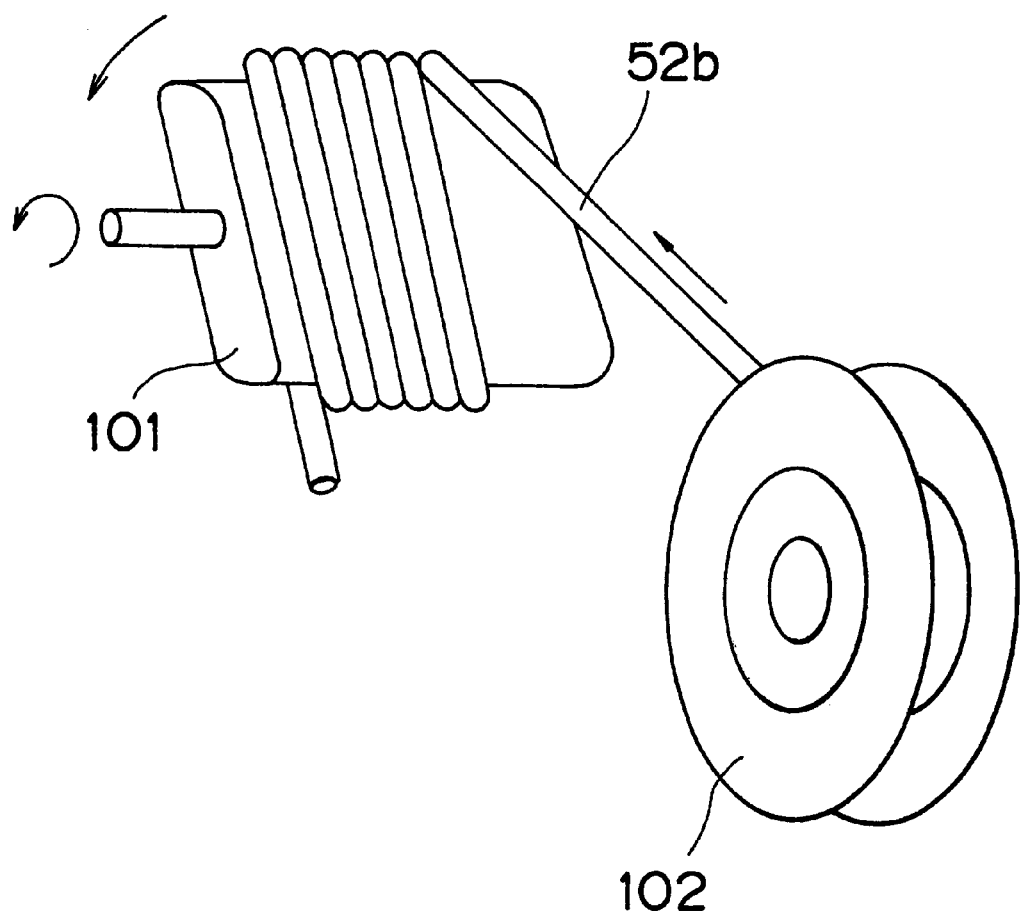
FIG. 5 is a schematic diagram of a coil winding step in the stator production process.

The stator 52 has a plurality of tooth parts 52a, each of which is formed as a block by laminating electromagnetic steel sheets in a direction of the axis, a coil 52b provided around each tooth part 52a, and a yoke portion 52c containing the tooth parts 52a and the coils 52b. The tooth parts 52a, the coils 52b and the yoke portion 52c are integrated by molding a resin having adhesion and electric insulation characteristics. As shown in FIGS. 2 and 4, each tooth part 52a has, at a radially inner side end thereof, a magnetic pole portion 52a1 extending in circumferential directions. Each tooth part 52a has, at a radially outer side end, a protruded portion 52a2 protruding in circumferential directions, wherein the amount of protrusion is approximately 0.3–1.0 mm. The magnetic pole portion 52a1 and the protruded portion 52a2 define a coil mounting portion 52a3 therebetween. Each tooth part 52a is mounted to the yoke portion 52c by fitting the protruded portion 52a2 into one of a plurality of dovetail grooves 52c1 formed in the yoke portion 52c. The coil mounting portion 52a3 of each tooth part 52a is wrapped with an insulating sheet 52d having a thickness substantially equal to the amount of protrusion L of the protruded portion 52a2 beforehand, that is, before a coil 52b is fitted onto the tooth part 52a. The insulating sheet 52d is made of an electrically insulating paper or a different material having an electrically insulating characteristic. The yoke portion 52c of each tooth part 52a is formed from a magnetic material that allows formation of magnetic paths therein and is suitable for a housing. The material of the yoke portion 52c may be a steel pipe of a low-carbon steel such as S10C, S15C, or the like, or an electromagnetic steel sheet.

Figure 6:
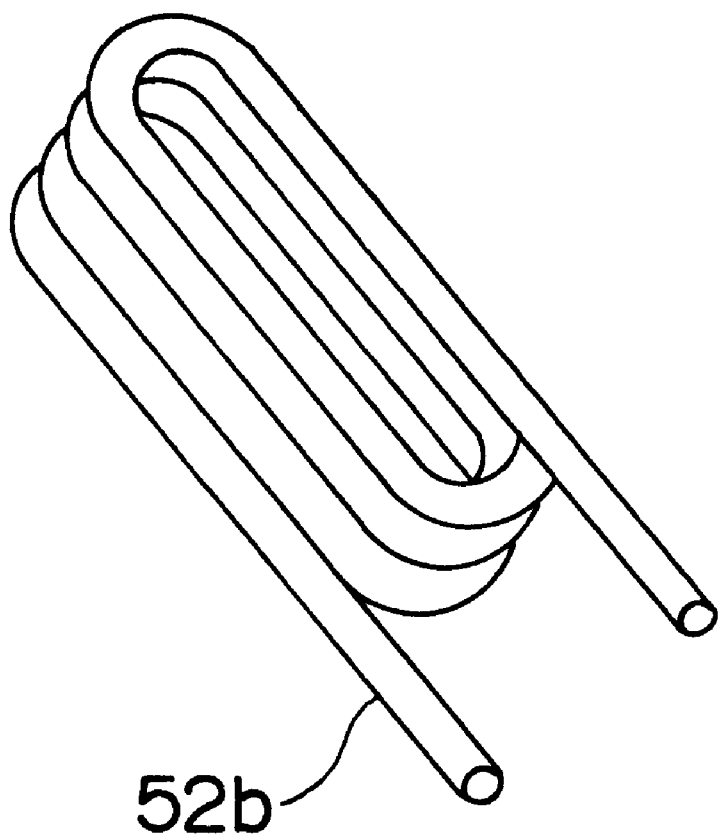
FIG. 6 is a perspective view of a coil formed by the coil winding step shown in FIG. 5.

The stator 52 is formed by steps shown by the schematic diagrams in FIGS. 5 through 10. In a coil winding step shown in FIG. 5, a wire from a reel 102 is wound on a jig 101 that is similar in shape to the coil mounting portion 52a3 of each tooth part 52a to a required number of turns. The wire may be a copper wire having a diameter of about 2.9 mm and coated with an insulating film. After cutting the wire, the formed coil 52b is removed from the jig 101, as shown in FIG. 6. It is also possible to wind the wire around the jig 101 to a number of turns corresponding to a plurality of coils 52b and, after cutting the wire and removing the winding from the jig 101, cut the winding into coils, each coil having a required number of turns in order to obtain a plurality of coils 52b, as shown in FIG. 6.

Figure 7:
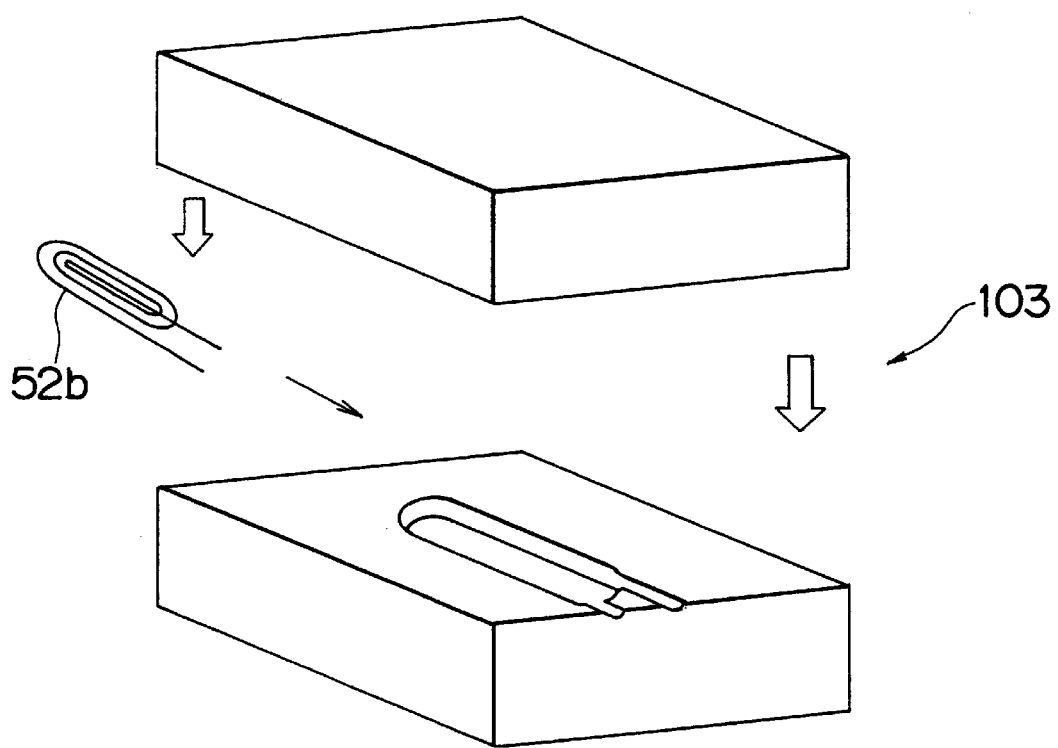
FIG. 7 is a schematic diagram of a coil press-forming step in the stator production process.

In a press-forming step shown in FIG. 7, the coil 52b, as shown in FIG. 6, is set in a press-forming jig 103, and then press-formed into a predetermined shape. The press-forming step deforms the coil 52b so that the intervals between winding turns are substantially eliminated and the coil 52b assumes a non-circular shape, thereby increasing the space factor of the coil 52b in the mounted state, as shown in FIG. 2.

Figure 8:
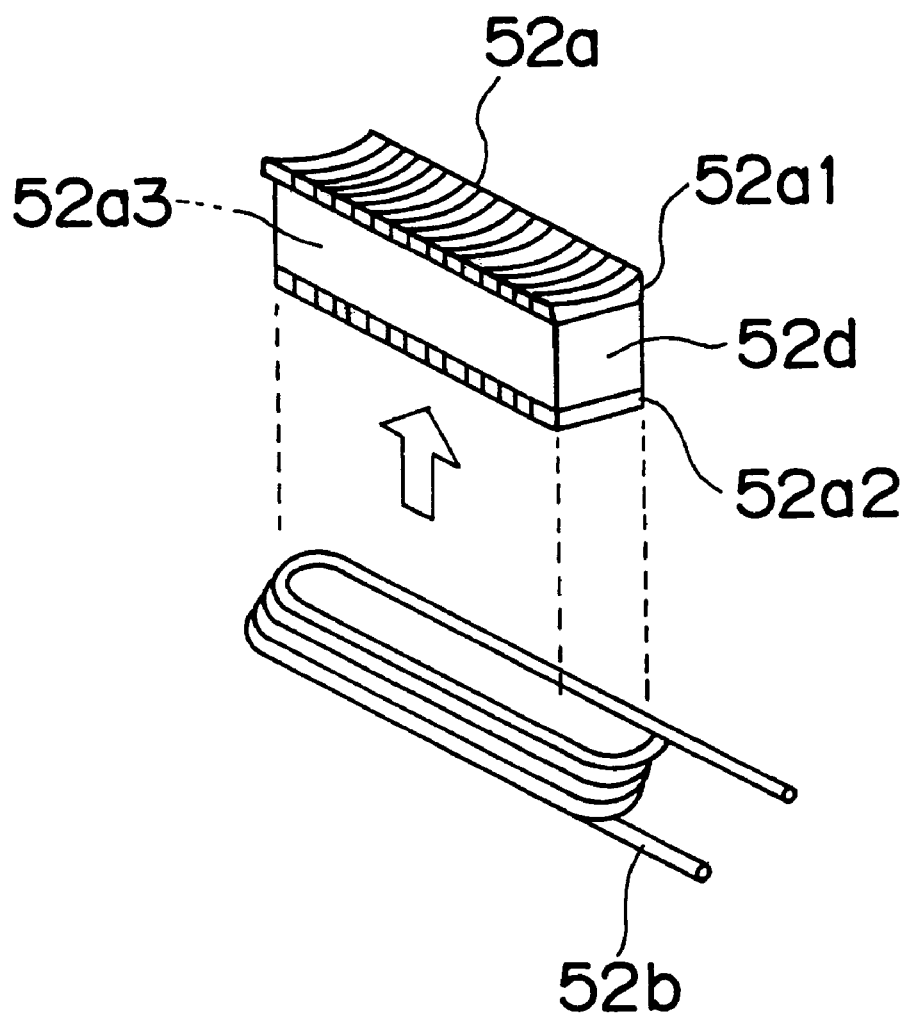
FIG. 8 is a schematic diagram of a coil fitting step in the stator production process.

In a coil fitting step shown in FIG. 8, the press-formed coil 52b, formed in the press-forming step shown in FIG. 7, is mounted to a tooth part 52a provided in the form of a block of laminated sheets, by fitting the coil 52b onto the coil mounting portion 52a3 from the protruded portion 52a2 side end. In this step, the coil mounting portion 52a3 of the tooth part 52a is wrapped with an insulating paper sheet 52d having a thickness substantially equal to the amount of protrusion of the protruded portion 52a2 beforehand, that is, before the coil 52b is fitted onto the tooth part 52a.

Figure 9:
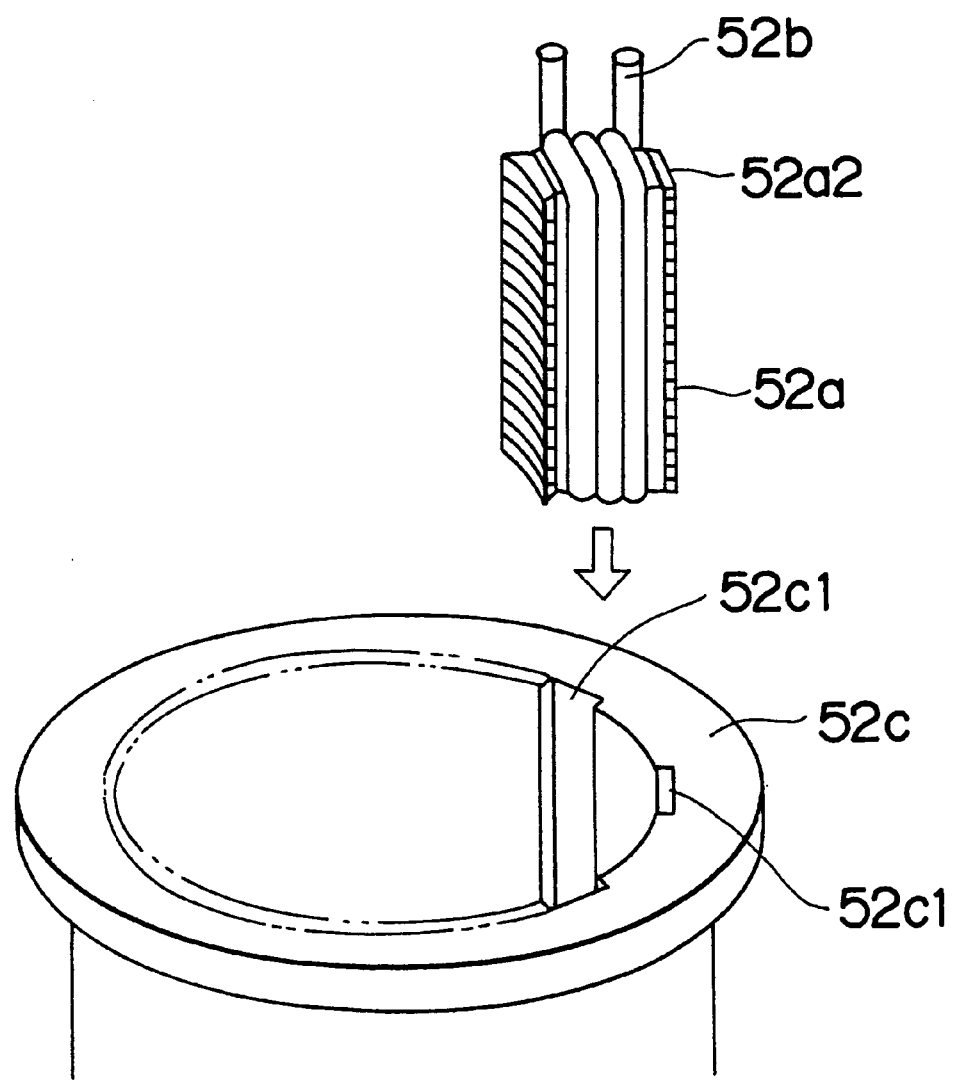
FIG. 9 is a schematic diagram of a step of fitting a tooth part provided with a coil to a yoke portion in the stator production process.

In the step of fitting tooth parts 52a provided with coils to the yoke portion 52c, as shown in FIG. 9, each tooth part 52a is fitted to a dovetail groove 52c1 formed in an inner peripheral surface of the yoke portion 52c. The tooth fitting step is completed by fitting all the tooth parts 52a to the yoke portion 52c.

Figure 10:
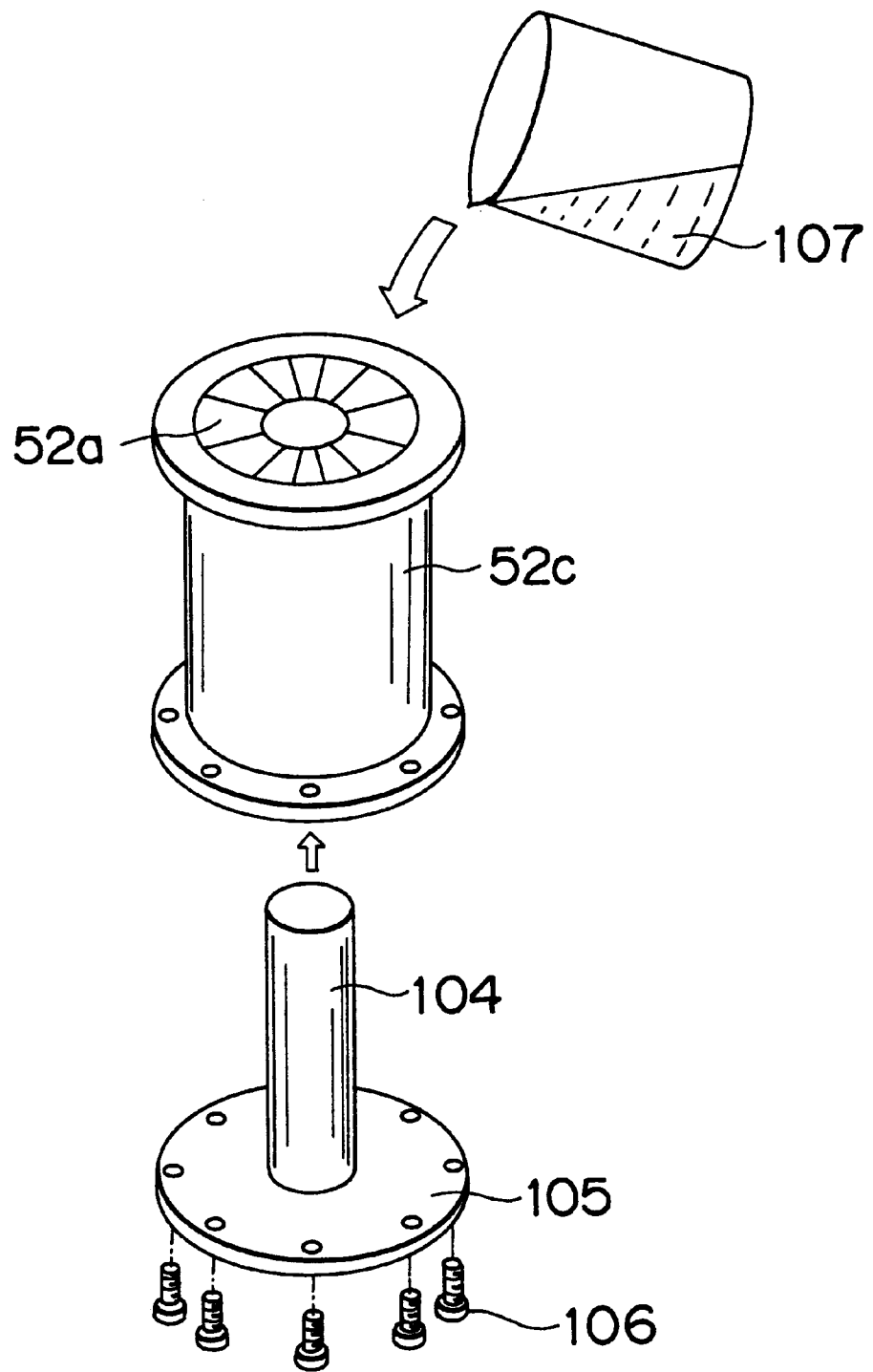
FIG. 10 is a schematic diagram of a molding step in the stator production process.

In a molding step shown in FIG. 10, the yoke portion 52c, provided with the required number of tooth parts 52a having coils in the tooth fitting step, is connected to a bottom plate 105 having a core 104 using bolts 106. Subsequently, a resin molding material liquid 107 having an electrically insulating characteristic is poured into the yoke portion 52c from the upper opening. After the resin molding material 107 is hardened by heating, the bottom plate 105 is removed together with the core 104. In this manner, a stator 52 in which the yoke portion 52c and all the tooth parts 52a with coils are integrated by an electrically insulting resin is produced. It is also possible to employ a high-efficient injection molding step for mass production, instead of the above-described molding step.

In the electric power steering apparatus of this embodiment, as a steering force is directly transmitted from the pinion of the input shaft 20 to the rack portion 31 of the steering shaft 30, output power of the electric motor 50 is transmitted to the screw shaft 41 of the steering shaft 30 via the ball screw mechanism 40 under control of the control device (not shown) so that the power from the electric motor 50 (steering assisting force) precisely supplements steering torque.

Figure 11:
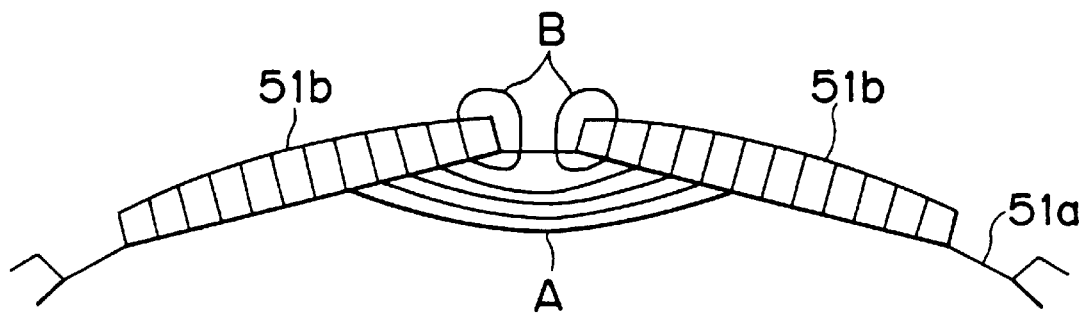
FIG. 11 is an enlarged schematic diagram of a comparative example prior art showing the magnetic flux distribution in the rotor and minor loops.
Figure 12A:
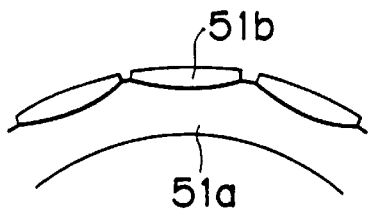
FIG. 12A shows the same embodiment of the invention as shown in FIG. 3 for comparison with comparative prior art examples.
Figure 12B:
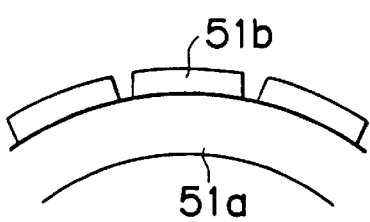
FIG. 12B shows comparative prior art example b for comparison with the embodiment shown in FIG. 12A.
Figure 12C:
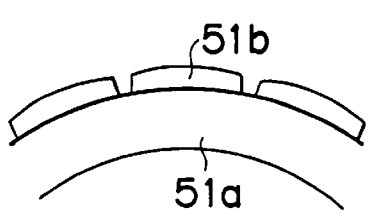
FIG. 12C shows comparative prior art example c for comparison with the embodiment shown in FIG. 12A.
Figure 12D:
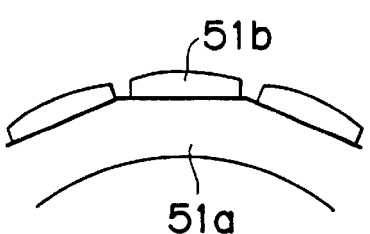
FIG. 12D shows comparative prior art example d for comparison with the embodiment shown in FIG. 12A.
Figure 12E:
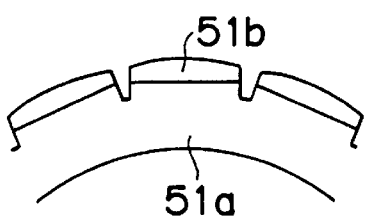
FIG. 12E shows comparative prior art example e for comparison with the embodiment shown in FIG. 12A.

In the electric motor 50 of this embodiment, the radially inner side surface of each permanent magnet 51b is curved to generally be convex in a radially inward direction and the outer peripheral surface of the rotor 51a has a plurality of concave recessed surfaces, each recessed surface substantially conforming to and contacting the radially inner side curved surface of a corresponding permanent magnet 51b, as shown in FIGS. 2 and 3. Therefore, the area of contact between each permanent magnet 51b and the rotor 51a is increased to substantially reduce the concentration of magnetic flux. A between adjacent permanent magnets 51b occurring locally in the rotor 51a in comparison with a comparative prior art example shown in FIG. 11. As shown in FIG. 11, each permanent magnet 51b has a semicylindrical sectional shape with a radially inner side surface being flat, and the outer peripheral surface of a rotor 51a has a flat surface that contacts the radially inner side flat surfaces of the permanent magnets 51b.

Therefore, the magnetic loss in the rotor 51a can be reduced so that the motor efficiency can be improved and the output torque can be increased. Furthermore, the occurrence of a minor loop B, as shown in FIG. 11, of magnetic flux of each permanent magnet 51b can be reduced so that the motor efficiency can be improved and the output torque can be increased and, moreover, occurrence of torque ripple and cogging can be reduced. In addition, since the permanent magnets 51b are partially embedded in the rotor 51a, the air gap formed between the rotor 51a and the stator 52 is reduced in size so that the output torque can be increased.

The electric motor 50 of this embodiment of the invention can be realize by changing the shape of the permanent magnets 51*b* and the shape of the rotor 51*a*. Therefore, in comparison with examples wherein permanent magnets 51*b* are enlarged in size to increase the output torque, the embodiment of the invention requires fewer costly permanent magnets, thereby allowing an economical and compact electric motor design. Thus, the embodiment of the invention provides a small-size and high-torque output electric motor 50 at a low cost.

FIGS. 12A through 12E and 13 indicate that the electric motor 50 of the embodiment of the invention is able to output high torque while using a small quantity of permanent magnets 51*b*, in comparison with the examples shown in FIGS. 12B–E. In comparative prior art example b shown in FIG. 12B, permanent magnets 51*b* having a generally "C" or arc sectional shape are fixed to the outer cylindrical surface of a rotor 51*a*. In comparative prior art example c shown in FIG. 12C, permanent magnets 51*b* having a semicylindrical sectional shape are fixed to the outer cylindrical surface of a rotor 51*a*. In comparative example d shown in FIG. 12D, permanent magnets 51*b* having a semicylindrical sectional shape are fixed to the flat surfaces formed on the outer peripheral surface of a rotor 51*a*. In comparative prior art example e shown in FIG. 12E, which has a structure similar to that of comparative prior art example d shown in FIG. 12D, a rotor 51*a* has grooves extending between the permanent magnets 51*b* in directions of the axis.

Figure 13:
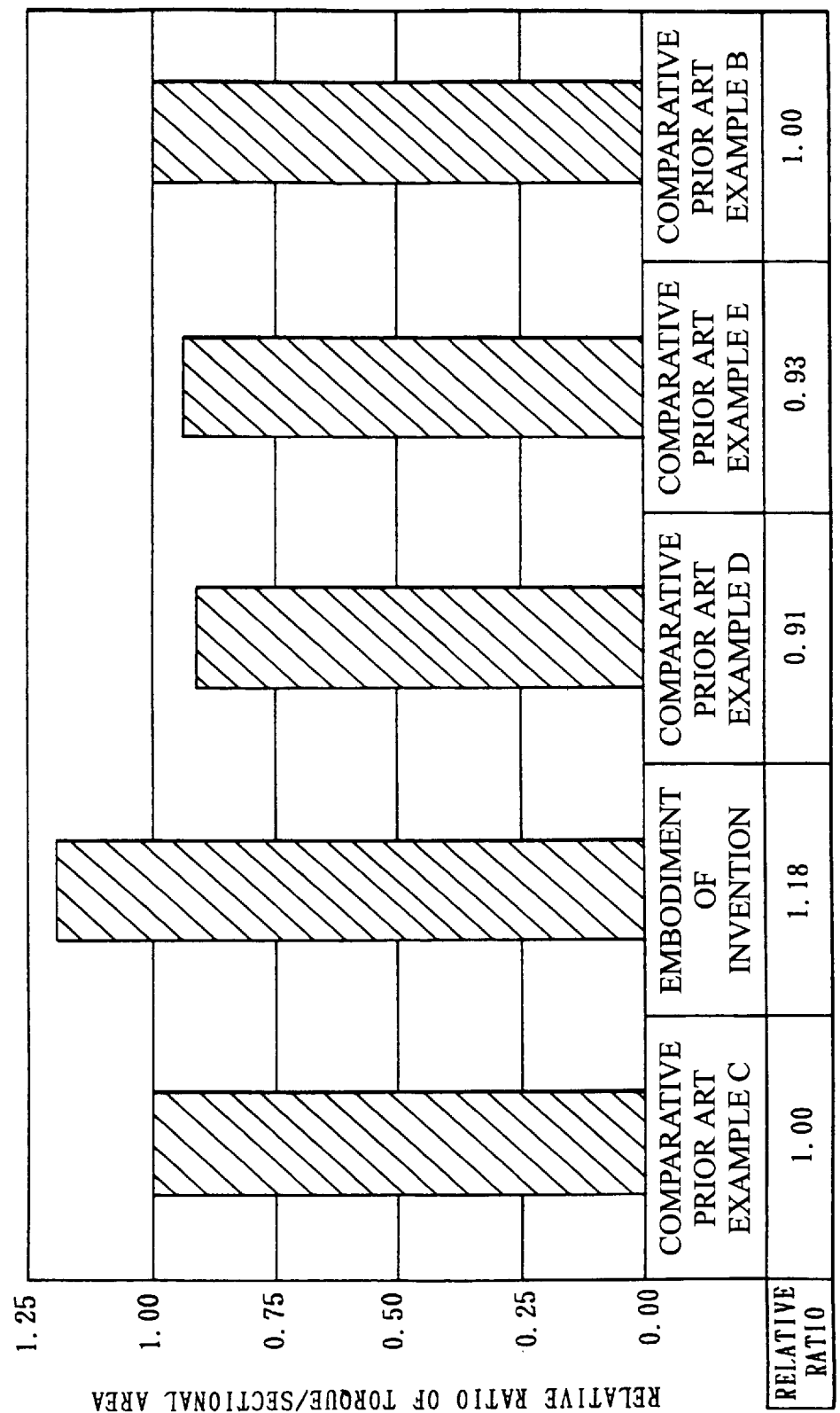
FIG. 13 is a graph showing the relative values of the torque/sectional area ratio of the embodiment shown in FIG. 12A compared to the prior art examples shown in FIGS. 12B through 12E.

In the graph shown in FIG. 13, the relative values of the torque/sectional area ratio are based on the value of torque/sectional area ratio in comparative prior art example b, which has the generally "C" or arc-shaped permanent magnets, as a reference value defined as 1.00. The term "torque" in "torque/sectional area" means output torque, and the term "sectional area" means the sectional area of each permanent magnet and corresponds to the volume thereof. Further, as can be seen from the comparative prior art examples shown in FIGS. 12B through 12E and 13, portions that can be considered to have been cut off in forming a radially inner side convex surface of each permanent magnet 51*b* in the embodiment are portions that do not greatly affect the output torque, that is, portions of a permanent magnet that would not cause a reduction in output torque if eliminated to reduce the size of the permanent magnet.

Still further, in the electric motor 50 of the embodiment of the invention, the area of contact between each permanent magnet 51*b* and the rotor 51*a* can be increased as described above, so that if each permanent magnet 51*b* is fixed to the rotor 51*a* by using an adhesive, for example, the adhesion strength can be increased. Further, since the radially outer side surface of the permanent magnet 51*b* is shaped similar to a circumferentially divided segment of the peripheral surface of an imaginary cylinder whose center axis coincides with the axis of the rotor 51*a*, each permanent magnet 51*b* can be adhered to and fixed to the outer peripheral surface of the rotor 51*a* with high precision by using the radially outer surface of each permanent magnet 51*b* as a reference surface. Thus, the assembling efficiency improves.

In the electric motor 50 of the embodiment, when a press-formed coil 52*b* is mounted to a tooth part 52*a* by fitting the coil 52*b* over the coil mounting portion 52*a*3 from the protruded portion 52*a*2 side of the tooth part 52*a*, the press-formed coil 52*b* is guided by the outer peripheral surface of the insulating sheet 52*d* after passing the protruded portion 52*a*2. Therefore, the press-formed coil 52*b* is substantially prevented from inclining relative to the tooth part 52*a* so that the coil 52*b* is substantially prevented from engaging with or impinging on the protruded portion 52*a*2.

Hence, the press-formed coil 52*b* can be smoothly and precisely fitted to the coil mounting portion 52*a*3 of the tooth part 52*a*.

The embodiment employs the formed coil 52*b* press-formed into a predetermined shape by using the press-forming jig 103, as shown in FIG. 7, as a formed coil to be mounted to the tooth part 52*a*. Therefore, the space factor of the coils in the stator 52 can be increased, so that the motor characteristics of the electric motor 50 can be improved while the electric motor 50 is reduced in size.

Figure 14:
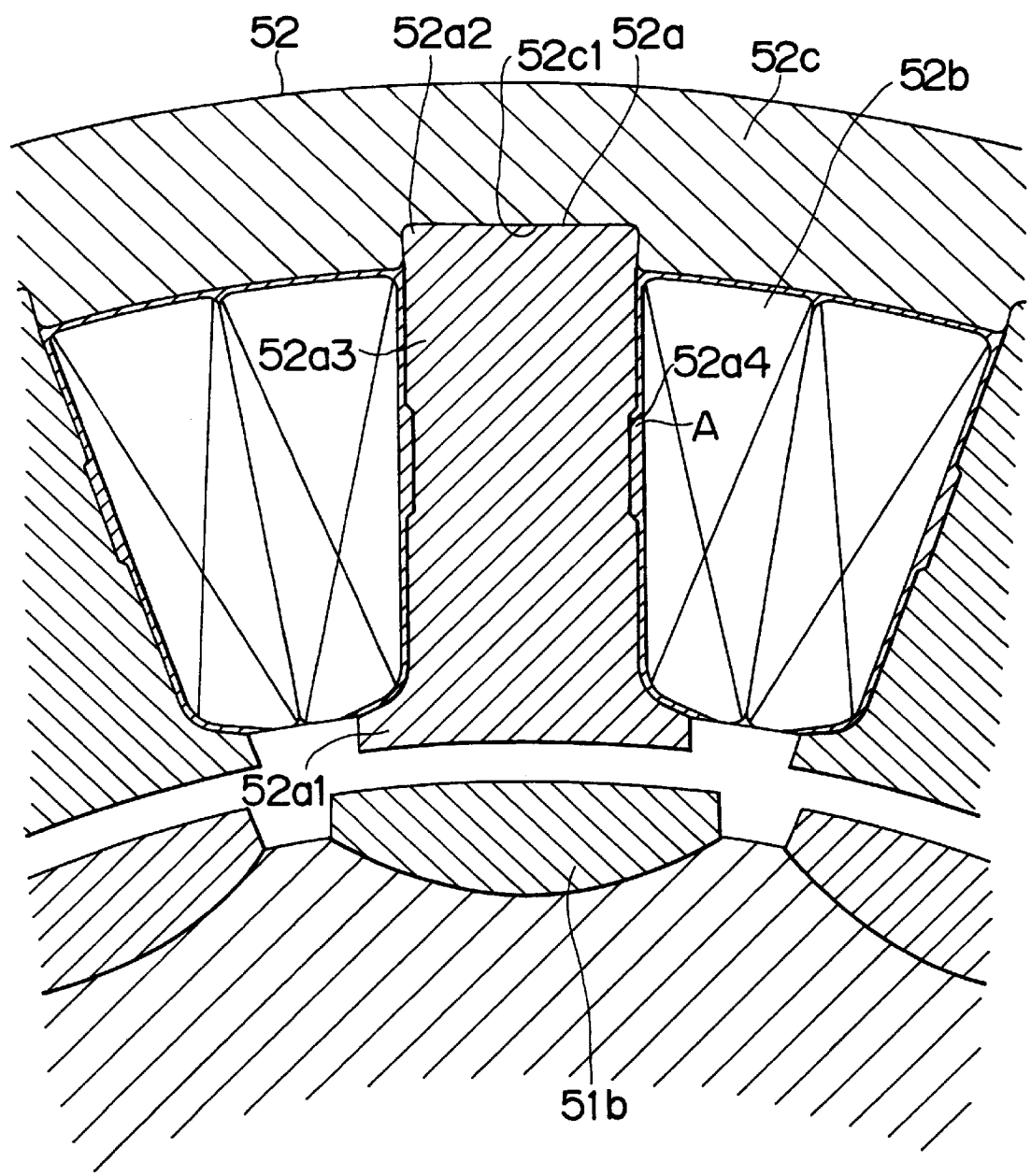
FIG. 14 is an enlarged sectional view of a tooth part.

In the foregoing embodiment, a coil (winding) is provided around the coil mounting portion 52*a*3 of each tooth part 52*a* with the insulating sheet 52*d* interposed therebetween. It is also preferable that, as shown in FIG. 14, longitudinally extending grooves 52*a*4 that allow passage of a well-known resin having an electrically insulating characteristic be formed on side surfaces of the coil mounting portion 52*a*3 of each tooth part 52*a*.

Provision of the grooves 52*a*4 on side surfaces of the coil mounting portion 52*a*3 of each tooth part 52*a* ensures that in the molding step of integrating each tooth part 52*a* with the coil 52*b* disposed thereon by using a resin having an adhesion characteristic and an electrically insulating characteristic as shown in FIG. 10, the resin will precisely flow into the gaps between each tooth part 52*a* and the coil 52*b* via the grooves 52*a*4. Therefore, by executing the molding step, an insulating resin layer is formed between each tooth part 52*a* and the coil 52*b* so as to achieve sufficient electric insulation between each tooth part 52*a* and coil 52*b* provided the tooth part 52*a*. Furthermore, since it becomes unnecessary to provide an insulating sheet in the gap between each tooth part 52*a* and coil 52*b* provided around the tooth part 52*a* before the resin molding step, the space factor of the coils 52*b* in the stator 52 can be increased and the motor characteristics can be improved.

Still further, in the embodiment, resin fixed and hardened after flowing in the grooves 52*a*4 restricts each tooth part 52*a* from moving radially inwards, and therefore prevents each tooth part 52*a* from falling apart from the yoke portion 52*c*.

In the electric power steering apparatus of the embodiment, the yoke portion 52*c* of the electric motor 50 can also serve as a portion of the housing 10 of the electric power steering apparatus so that the electric power steering apparatus can be simplified in structure and reduced in size. Furthermore, a steering pre-load torque (load) can be produced by utilizing an amount of iron loss, occurring in the yoke portion 52*c*, so that appropriate vehicle running stability will be ensured. The appropriate vehicle running stability is defined as the prevention of yaw movements caused by force inputted from the steered wheels via the steering shaft (reverse input).

In the embodiment, since the yoke portion 52*c* of the electric motor 50 is formed by a steel pipe, for example, the amount of costly electromagnetic steel sheets used in the electric motor 50 is reduced. Furthermore, the yoke portion 52*c* itself can be provided at a low cost so that the electric power steering apparatus can be produced at a low cost. Further, the steering shaft 30 is a rack bar disposed and extending in the output shaft 51 of the electric motor 50 coaxially with the output shaft 51. Thus, the electric motor 50 is arranged around the rack bar, that is, the steering shaft 30, in a compact manner so that the diameter thereof is reduced. Therefore, the electric power steering apparatus can be reduced in size.

Although in the foregoing embodiment, the invention is applied to the electric motor 50 of the electric power steering apparatus, the invention is not limited to the embodiment, but is applicable to various electric motors wherein a plurality of permanent magnets are arranged on an outer peripheral surface of a rotor provided for rotation in a stator.

While the invention has been described in conjunction with a specific embodiment thereof, it is evident that many alternatives, modifications and variations may be apparent to those skilled in the art. Accordingly, the preferred embodiment of the invention as set forth herein is intended to be illustrative, not limiting. Various changes may be made without departing from the spirit and scope of the invention.

What is claimed is:

1. An electric motor comprising:
   a stator, the stator having a plurality of tooth parts, each tooth part having a radially inner side end and a radially outer side end, the radially inner side end of each tooth part having a magnetic pole portion extending in a circumferential direction and a protruded portion protruding in the circumferential direction from the radially outer side end, the magnetic pole portion and protruded portion defining a coil mounting portion wrapped by an insulating sheet;
   a coil provided around each tooth part;
   a yoke having a plurality of dovetail grooves extending along a radially inner peripheral surface of the yoke, the yoke containing the tooth parts and coil, the tooth parts, coil and yoke being integrated by molding using a resin having at least one of adhesion and electric insulation characteristics;
   a rotor that rotates within the stator, the rotor having an outer peripheral surface; and
   a plurality of permanent magnets disposed on the outer peripheral surface of the rotor, each magnet having a radially inner side surface, a radially outer side surface and a pair of opposite ends, the radially inner side surface of each magnet being curved to generally be convex in a radially inward direction and the outer peripheral surface of the rotor having a plurality of curved recess surfaces, each of the curved recess surfaces contacting the radially inner side curved surface of a corresponding magnet.

2. The electric motor according to claim 1, wherein the insulating sheet comprises an electrically insulating material having a thickness substantially equal to an amount of protrusion the protruded portion protrudes from the radially outer side end of each tooth part.

3. The electric motor according to claim 1, wherein the coil mounting portion includes a longitudinally extending groove to allow passage of the resin having electric insulation characteristics.

4. The electric motor according to claim 1, wherein each tooth part is mounted to the yoke portion by fitting the protruded portion into a corresponding dovetail groove.

5. An electric motor comprising:
   a stator, the stator having a plurality of tooth parts, each tooth part having a radially inner side end and a radially outer side end;
   a coil provided around each tooth part, the coil being formed into a predetermined shape by being pressed using a press-forming jig;
   a yoke having a plurality of dovetail grooves extending along a radially inner peripheral surface of the yoke, the yoke containing the tooth parts and coil, the tooth parts, coil and yoke being integrated by molding using a resin having at least one of adhesion and electric insulation characteristics;
   a rotor that rotates within the stator, the rotor having an outer peripheral surface; and
   a plurality of permanent magnets disposed on the outer peripheral surface of the rotor, each magnet having a radially inner side surface, a radially outer side surface and a pair of opposite ends, the radially inner side surface of each magnet being curved to generally be convex in a radially inward direction and the outer peripheral surface of the rotor having a plurality of curved recess surfaces, each of the curved recess surfaces contacting the radially inner side curved surface of a corresponding magnet.

6. An electric power steering apparatus comprising:
   an electric motor that generates a steering assisting force for supplementing a steering force; and
   a steering shaft that receives the steering assisting force, the electric motor including:
      a stator, the stator having a plurality of tooth parts, each tooth part having a radially inner side end and a radially outer side end;
      a coil provided around each tooth part, the coil being formed into a predetermined shape by being pressed using a press-forming jig;
      a yoke having a plurality of dovetail grooves extending along a radially inner peripheral surface of the yoke, the yoke containing the tooth parts and coil, the tooth parts, coil and yoke being integrated by molding using a resin having at least one of adhesion and electric insulation characteristics;
      a rotor that rotates in the stator, the rotor having an outer peripheral surface; and
      a plurality of permanent magnets disposed on the outer peripheral surface of the rotor, each magnet having a radially inner side surface, a radially outer side surface and a pair of opposite ends, the radially inner side surface of each magnet being curved to generally be convex in a radially inward direction and the outer peripheral surface of the rotor has a plurality of curved recess surfaces, each of the curved recess surfaces contacting the radially inner side curved surface of a corresponding magnet.

7. The electric power steering apparatus according to claim 6, wherein the insulating sheet comprises an electrically insulating material having a thickness substantially equal to an amount of protrusion the protruded portion protrudes from the radially outer side end of each tooth part.

8. The electric power steering apparatus according to claim 6, wherein the coil mounting portion includes a longitudinally extending groove to allow passage of the resin having electric insulation characteristics.

9. The electric power steering apparatus according to claim 6, wherein each tooth part is mounted to the yoke portion by fitting the protruded portion into a corresponding dovetail groove.

10. An electric power steering apparatus comprising:
    an electric motor that generates a steering assisting force for supplementing a steering force; and
    a steering shaft that receives the steering assisting force, the electric motor including:
       a stator, the stator having a plurality of tooth parts, each tooth part having a radially inner side end and a radially outer side end, the radially inner side end of each tooth part having a magnetic pole portion extending in a circumferential direction and a protruded portion protruding in the circumferential direction from the radially outer side end, the magnetic pole portion and protruded portion defining a coil mounting portion wrapped by an insulating sheet;

a coil provided around each tooth part;

a yoke having a plurality of dovetail grooves extending along a radially inner peripheral surface of the yoke, the yoke containing the tooth parts and coil, the tooth parts, coil and yoke being integrated by molding using a resin having at least one of adhesion and electric insulation characteristics;

a rotor that rotates in the stator, the rotor having an outer peripheral surface; and a plurality of permanent magnets disposed on the outer peripheral surface of the rotor, each magnet having a radially inner side surface, a radially outer side surface and a pair of opposite ends, the radially inner side surface of each magnet being curved to generally be convex in a radially inward direction and the outer peripheral surface of the rotor has a plurality of curved recess surfaces, each of the curved recess surfaces contacting the radially inner side curved surface of a corresponding magnet.

* * * * *